ELECTROLUMINESCENT PROCESS INCLUDING INJECTION OF NEGATIVE CARRIERS INTO A CRYSTAL OF AN ORGANIC COMPOUND

Filed March 24, 1965

[NEGATIVE CARRIER INJECTION]

[NEGATIVE AND POSITIVE CARRIER INJECTION]

INVENTOR.
WOLFGANG MEHL

BY John E. Hanslow

ATTORNEY

United States Patent Office 3,382,394

Patented May 7, 1968

3,382,394

ELECTROLUMINESCENT PROCESS INCLUDING INJECTION OF NEGATIVE CARRIERS INTO A CRYSTAL OF AN ORGANIC COMPOUND

Wolfgang Mehl, Meinier, Switzerland, assignor to American Cyanamid Company, Stamford, Conn., a corporation of Maine Filed Mar. 24, 1965, Ser. No. 442,325
5 Claims. (Cl. 313—108)

ABSTRACT OF THE DISCLOSURE

The invention relates to a process for injecting negative charged carriers into single crystals of substantially pure organic compounds having fused rings, such as anthracene. This is accomplished by contacting such a crystal with a reducing agent of sufficient strength to inject negatively charged carriers of the organic compound into the crystal when the crystal and the reducing agent are subjected to an electrical field. A useful reducing agent is an ethylenediamine solution of lithium metal.

The invention further relates to the generation of visible light by providing a process in which positive charged carriers may be injected into the same crystal simultaneously with the negative charged carriers when a suitable oxidizing agent is placed in contact with a second side of the crystal and the reducing agent crystal and oxidizing agent are subject to an electrical field.

This invention relates to a process for injecting negative charge carriers into single crystals of organic compounds having fused rings, as for example, anthracene, and further to the injection of both negative and positive carriers into such crystals with an electric field so as to generate light.

Positive charge carriers have heretofore been injected into crystals of organic compounds including those having fused rings, as for example, anthracene. Typically, this has been done with an aqueous solution of a strongly oxidizing redox system, as for example, $Ce^{4+}/Ce^{3+}$, $I^-/I_3^-$ solutions which have been employed to make ohmic contact and produce a reservoir of positive charge carriers at the phase boundary. From this reservoir, holes are injected into the "valence band" when an electric field is applied.

Heretofore, negative charge carriers have not been injected into crystals of organic compounds such as anthracene, for it was not known, nor was it obvious how to produce such carriers at the surface of such crystals.

If one could discover how to inject both negative and positive charge carriers into crystals of such compounds as anthracene when an electric field is applied, the energy released by the union of these charged particles would result in the emission of light, and a new electroluminescent system would, therefore, have been discovered.

It is an object of the present invention to provide a process for injecting negative charge carriers into single crystals of organic compounds having fused rings.

It is a further object of this invention to provide a process for injecting both negative charge carriers and positive charge carriers into single crystals of organic compounds.

It is another object of this invention to provide a process for injecting both negative charge carriers and positive charge carriers into single crystals of organic compounds when an electric field is applied, which constitutes a new electroluminescent system.

It is a still further object to provide a new electroluminescent system as described above, in which the negative and positive charge carriers are not required to be formed independently of or prior to the establishment or operation of the electroluminesecnt system.

Figure 1:
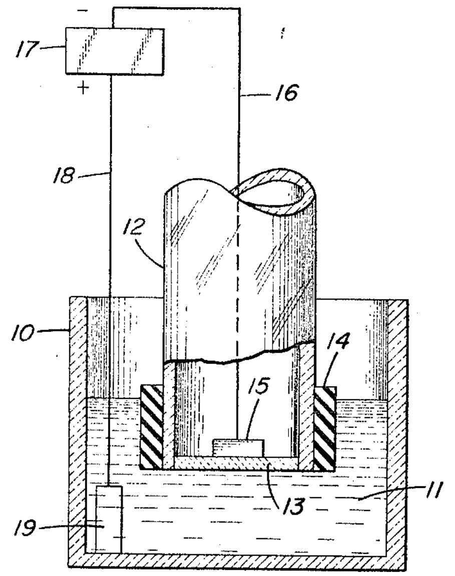
Figure 2:
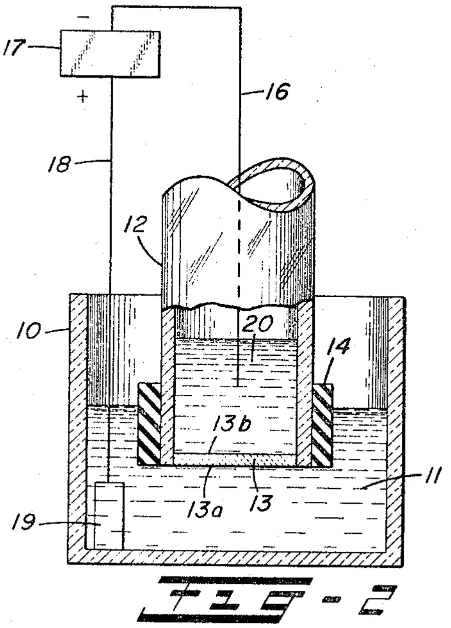

These and other objects and advantages of the present invention will become more apparent from the detailed description thereof set forth hereinbelow and by reference to the accompanying drawings, in which FIG. 1 is a side view partly in section of an apparatus which may be employed to inject negative charge carriers; and FIG. 2 is a side view partly in section of an apparatus which may be employed to inject both negative and positive charge carriers into a suitable crystal when an electric field is applied.

In accordance with this invention a process is provided for injecting negative charge carriers into single crystals of a substantially pure organic compound having fused rings, which comprises contacting a crystal with a reducing agent of sufficient strength to generate negative charge carriers on the surface of the crystal compound, and inject them into the crystal when the said crystal and reducing agent in contact therewith are subject to an electric field.

The process in injecting both positive and negative charge carriers into such crystal or the process for generating light by electroluminescence, in accordance with this invention, is one in which one side of said crystal is contacted with an oxidizing agent having an oxidizing potential greater than 500 mv. measured on the saturated calomel electrode and contacting a second side of the crystal with a reducing agent as described above, and applying an electric field to such a system.

The crystal of the organic compounds contemplated by this invention should preferably be single crystals and preferably substantially pure, i.e., at least about 99% pure. These requirements are believed to be necessary, since imperfections in the crystals or the presence of contaminating materials seem to function as traps for the free carriers.

These crystals must be of organic compounds having fused rings. Typically, such compounds include anthracene, substituted anthracenes such as diphenyl anthracene, various dialkyl anthracenes such as dimethylanthracene, and higher ring compounds tetracene, pentacene and the like.

Of the compounds enumerated, anthracene is preferred because of its uniformly good performance to date, and because it is a material that is readily available in high purity.

The reducing agent employed in the present system is one of sufficient strength to generate negative ions at a surface of the crystal so that negative space charges can be injected into the electron or conduction band of the said crystal. Typically, such reducing agent comprises a solution of an alkali metal, such as sodium, potassium or lithium, which contains free electrons. Normally, such an agent comprises an alkali metal and solvent for the metal, which solvent is not a solvent for the crystal of the organic compound. Such solvents include liquid ammonia, tetrahydrofuran, ethylenediamine, and the like.

The oxidizing agent must be one having an oxidizing potential of at least 500 mv. measured on the saturated calomel electrode, and typically include sulfuric acid having a concentration greater than 30%, aqueous solution of chlorine, bromine and iodine, potassium bichromate in sulfuric acid, potassium permanganate in sulfuric acid, ceric ion solutions, solutions containing iridium (IV) hexachloride ($IrCl_6^{2-}$) ions, iridium (IV) hexabromide ($IrBr_6^{2-}$) ions, iridium (IV) hexaiodide ($IrI_6^{2-}$) ions, and the like.

In the above description the term "contacting," when employed in reference to both the reducing agent and oxidizing agent, is employed to mean that these agents are actually in physical and electrical contact with the crystal.

Referring to the drawing and in particular FIG. 1, which is illustrative of a negative carrier injection system and is illustrated further in detail in Example 1, 10 designates a suitable vessel such as a glass cell containing a strong reducing agent 11, and having positioned therein a hollow glass tube 12 having positioned at the bottom thereof and in contact with the strong reducing agent a substantially pure single crystal of a siutable organic compound 13. Positioned about the bottom of glass tube 12 is an insulator 14 which is present to prevent electrical contact.

Positioned inside tube 12 and connected at one of its ends through metallic conductor 15 is a current conducting wire 16 joined at its other end to the negative terminal of power source 17. Joined to the positive terminal of said power source 17 is a conductive wire 18 which is joined to an electrode 19 immersed in said reducing agent.

When an electric field is applied in accordance with this invention, employing such a system, negative charge carriers are injected into the single crystal pure organic compound.

Referring to FIG. 2, the numbers employed in FIG. 1 designate the same portion of the electroluminescent system illustrated in FIG. 2. It will be observed that instead of a current conducting wire 16 contacting the substantially pure single crystal 13 through metallic conductor 15, electrical contact is made through an oxidizing solution 20.

When an electric field is applied, as from power source 17, negative charge carriers are injected into crystal 13 through side **13*a*, while positive charge carriers are injected through side 13*b***.

In order to illustrate the present invention, the following examples are given primarily by way of illustration. No specific details or enumerations contained therein should be construed as a limitation thereon except insofar as they appear in the appended claims. All parts and percentages are by weight unless otherwise specifically designated.

*Example 1*

A single crystal of high purity anthracene which consisted of a flat plate 50–200$\mu$ thick with a surface area of about 0.1 cm.$^2$ was mounted with an insulator onto a glass rod which could be slid into a conventional electrolytic glass cell. On the rear of the crystal electric contact was made with either a metal deposited by evaporation, a drop of mercury or an inert aqueous salt solution, e.g., NaCl in water. The total system (glass rod+crystal) was immersed into a solution which was prepared in the following way:

About 100 ml. of high purity ethylenediamine was placed into the carefully evacuated and dried cell. A lump of about 5 g. lithium metal was then dropped into this solution which was stirred magnetically. The lithium dissolved quickly with the formation of a blue solution of $Li^+$ ions and free solvated electrons. Into this solution the anthracene electrode and a separate platinum electrode were then immersed. An electric field was applied between the metallic contact in the rear of the anthracene and the platinum electrode, making the platinum negative. A current up to several milliamperes/cm.$^2$ at $5\times10^6$ v./cm. could then be drawn through the anthracene crystal based on an injection of electrons into the crystal. In the reverse direction only leakage through the insulator leading to about $10^{-9}$ amps/cm.$^2$ at the highest applied field ($5\times10^6$ v./cm.) was observed.

The injection of a negative space charge into anthracene has thus been established.

*Example 2*

In a second experiment the contact in the rear of the anthracene was replaced by a strongly oxidizing solution, e.g., a solution of $Ce(SO_4)_2$ in a mixture of equal parts of concentrated sulfuric acid and distilled water. A platinum electrode was immersed into this solution. This system thus consisted of one electrode compartment which contained $Ce(SO_4)_2$, $H_2SO_4$ and water and another one which contained ethylenediamine, lithium ions and solvated electrons, the two compartments being separated by an anthracene single crystal.

When a voltage was now applied between the two platinum electrodes making the one in the $Ce(SO_4)_2$ solution positive and the one in the ethylenediamine solution negative, a positive space charge was injected into the crystal from the positive electrode compartment and a negative space charge from the negative electrode compartment. It was observed that some of the negative and positive free carriers recombined with the emission of bright blue light (electroluminescence).

This light emission was observed for applied fields higher than $5\times10^4$ volts/cm. when currents larger than $10^{-5}$ amps/cm.$^2$ passed through the crystal.

It was observed that during double injection the total current was more then ten times larger than the negative and positive current measured independently.

I claim:

1. A process for injecting negative charge carriers into single crystals of a substantially pure organic compound having fused rings, which comprises contacting a crystal with a reducing agent of sufficient strength to inject negative charge carriers of the crystal organic compound into said crystal when said crystal and said reducing agent are subject to an electrical field.

2. A process for injecting negative charge carriers into single crystals of substantially pure anthracene which comprises contacting a crystal with a reducing agent comprising a non-aqueous solution of an alkali metal and subjecting said crystal and said solution of an alkali metal to an electrical field.

3. A process for generating light which comprises injecting both positive and negative charge carriers into a single crystal of a substantially pure organic compound having fused rings, which comprises injecting positive carriers in said crystal by contacting one side of said crystal with an oxidizing agent having an oxidizing potential greater than 500 mv. measured on the saturated calomel electrode, and contacting a second side of the crystal with a reducing agent of sufficient strength to inject negative charge carriers of the crystalline organic compound into said crystal when said crystal is subject to an electrical field, subjecting said crystal to an electrical field so as to simultaneously inject both positive and negative charge carriers into said crystal, wherein said carriers unite to generate visible light.

4. A process for generating light by electroluminescence which comprises injecting both positive and negative charge carriers into a single crystal of substantially pure anthracene which comprises injecting a positive carrier into said anthracene crystal by contacting one side of said crystal with a solution of ceric ion and sulfuric acid and contacting a second side with an ethylenediamine solution of lithium metal, subjecting said crystal to an electrical field so as to simultaneously inject both positive and negative charge carriers into said crystal wherein said carriers unite to generate visible light.

5. A device for generating light by electroluminescence which comprises a single crystal of a substantially pure organic compound having fused rings, a reducing agent in contact with one side of said crystal and an oxidizing agent in contact with a second side of said crystal, said oxidizing and reducing agent being in both physical and electrical contact with said crystal, said oxidizing agent having an oxidizing potential greater than 500 mv. measured on the saturated calomel electrode, said reducing agent being of sufficient strength to inject negative charged carriers of the crystalline organic compound into said crystal when said crystal is subject to an electrical field and means for subjecting said crystal to an electrical field whereby both positive and negative charged carriers may be injected simultaneously into said crystal.

References Cited

Chemical Abstracts, vol. 52, 231(f), "Lithium in Ethylenediamene: A New Reducing System for Organic Compounds."

Pope, "Electroluminescence in Organic Crystals," J. Chem. Phys., vol. 38, p. 2042–2043 (1963).

Pope, "Charge Injection into Organic Crystals: . . .," J. Chem. Phys., vol. 36, No. 9, p. 2486–2492 (1962).

Pope, "Electronic Conductivity in Organic Material," Am. Chem. Soc., Division of Polymer Chemistry Preprints V, 4(1), (1963).

JAMES W. LAWRENCE, *Primary Examiner.*

R. L. JUDD, *Assistant Examiner.*